(12) United States Patent
Jaques et al.

(10) Patent No.: US 7,608,795 B2
(45) Date of Patent: Oct. 27, 2009

(54) DEVICE FOR MACHINING BY ELECTROEROSION

(75) Inventors: Fabrice Jaques, Meyrin (CH); Sebastian Dorthe, St. Ursen (CH); Maurizio Tognolini, Bassins (CH); Guy Demule, Cornier (FR); Ernesto Bühler, Losone (CH)

(73) Assignee: Charmilles Technologies S.A., Meyrin (CH)

( * ) Notice: Subject to any disclaimer, the term of this patent is extended or adjusted under 35 U.S.C. 154(b) by 547 days.

(21) Appl. No.: 10/551,688

(22) PCT Filed: Apr. 30, 2004

(86) PCT No.: PCT/CH2004/000264

§ 371 (c)(1),
(2), (4) Date: Aug. 3, 2006

(87) PCT Pub. No.: WO2004/103626

PCT Pub. Date: Dec. 2, 2004

(65) Prior Publication Data

US 2007/0163999 A1 Jul. 19, 2007

(30) Foreign Application Priority Data

May 22, 2003 (CH) .................................... 0920/03

(51) Int. Cl.
B23H 7/04 (2006.01)
B23H 1/02 (2006.01)

(52) U.S. Cl. .................................. 219/69.12; 219/69.13

(58) Field of Classification Search .............. 219/69.12, 219/69.13, 69.18
See application file for complete search history.

(56) References Cited

U.S. PATENT DOCUMENTS

| | | | |
|---|---|---|---|
| 4,661,674 A | 4/1987 | Inoue | |
| 5,585,014 A | 12/1996 | Magara | |
| 6,525,287 B2 * | 2/2003 | Lin | 219/69.13 |
| 6,811,150 B2 * | 11/2004 | Nordquist et al. | 219/69.11 |

FOREIGN PATENT DOCUMENTS

| | | |
|---|---|---|
| EP | 0 392 074 | 10/1990 |
| EP | 1 193 016 | 4/2002 |
| JP | 01240223 | 9/1989 |
| SU | 135744 A * | 6/1977 |

\* cited by examiner

Primary Examiner—Geoffrey S Evans
(74) Attorney, Agent, or Firm—Bachman & LaPointe, P.C.

(57) ABSTRACT

The electrical discharge machining device comprises a first voltage/current source (U1) for discharge initiation connected to the tool electrode (F) and a workpiece electrode (P) forming the poles of a machining gap (G) and a second voltage/current source (U2) that can be disconnected by way of two switches (SW1, SW2). Capacitive elements (C1, C5) are mounted in series in the lines (10, 11) connecting the first source to the poles of the machining gap (G). In addition, these poles can be connected by a self-induction coil (Lm) mounted in series with an adjustable DC source (Sm). Thanks to these features, the energy of the eroding discharges can be significantly reduced in order to obtain a superfine surface finishing process of high quality, while at the same time precisely controlling the mean voltage across the terminals of the machining gap.

12 Claims, 11 Drawing Sheets

DEVICE FOR MACHINING BY ELECTROEROSION

BACKGROUND OF THE INVENTION

The present invention relates to an electrical discharge machining device comprising a tool electrode and a workpiece electrode forming the poles of a machining gap, at least one voltage/current source connected by an electrical circuit to the tool electrode and to the workpiece electrode and configured to generate electrical pulses and to establish the initiation of electrical discharges between the tool electrode and the workpiece electrode.

In particular, the tool electrode used can be a wire stretched between two guides. The main concern hereinafter will be superfine surface finishing by electrical discharge machining using a wire electrode that allows the finest surface conditions to be obtained.

In order to cut out a workpiece by electrical discharge machining using a wire, several passes are usually made; firstly, the rough-cut pass opens a passage for the wire; the surface condition obtained is very rough; in addition, the size of the workpiece obtained is purposely over-dimensioned in order to allow the subsequent passes, for fine finishing and superfine finishing, to approach the final dimensions and to produce a smoother surface state.

The majority of electrical discharge machining tools comprise two voltage/current generators; one designed to promote the initiation of the discharges; the other of higher power designed to supply the energy for the most erosive discharges. In superfine surface finishing mode, it is desired to reduce the roughness of the surfaces obtained by electrical discharge machining and hence to decrease the energy of the eroding discharges. Consequently, normally only the 'discharge initiation' generator is used, the relays connecting the high-power generator to the machining region remaining open.

Here, a problem is encountered associated with the current lines that connect the generator or generators to the workpiece and wire electrode. These lines are normally coaxial cables whose essential property is to have a low inductance that allows the rough-cut generator to produce current pulses with very steep edges of the order of 1000 amps per microsecond. However, this low inductance of the lines no longer provides a clear advantage during surface finishing regimes. Worse still, the coaxial cables comprise high distributed capacitances which form energy reservoirs that are incompatible with the surface finishing regimes.

It is known to those skilled in the art that the discharge initiation generator applies a voltage to the machining gap that is high enough to cause the discharge initiation without being able to deliver a high current, whereas the rough-cut generator behaves as a high current source as soon as the discharge is initiated. The discharge initiation generator applies a voltage, for example of 80 to 240 V, for an indeterminate time until the avalanche phenomenon that is often described occurs. In superfine surface finishing mode, the total energy of the discharge does not only depend on the pulse of current, as low as it is, delivered by the discharge initiation generator, but depends above all on the sum of the energies contained in the distributed capacitances connected to the terminals of the gap and to which the initiation voltage is applied, which capacitances empty their energy into the ionized channel as soon as the arc strikes.

The main problem in superfine surface finishing machining consists in localizing the stray capacitances which can discharge their energy across the gap when the arc strikes, then in blocking or attenuating this energy. The patent application EP 1 193 016 A2 illustrates some typical scenarios. Notably, in FIG. 1 of this document, for each of the stray capacitances shown, a current loop passing through the gap can be found by which the energy of the capacitance in question can be transferred into the eroding discharge when it strikes. By opening the switches disposed between the rough-cut generator and the gap, the effect of multiple stray capacitances on the machining process is blocked. The rough-cut generator with its coaxial cables is disconnected. Only a second surface finishing generator, which can be the discharge initiation generator, is connected to the gap so as to minimize the distributed stray capacitances attached to all the lines. By inserting an insulating plate between the workpiece to be machined and its holder, a capacitor is created whose capacitance will attenuate the effect of a stray capacitance of the wire electrode and also of the whole unwinding and removal system for the wire, with respect to ground. Only the capacitance that includes the capacitance of the gap itself, between the wire and the workpiece, can neither be attenuated nor blocked. The representation of the problem, such as is described in EP 1 193 016 A2, makes apparent neither the distributed stray capacitances attached to the lines between the surface finishing generator and the gap, nor those attached to the surface finishing generator, assumed to be negligible here.

Unfortunately, it turns out that these capacitances cannot be considered as insignificant.

SUMMARY OF THE INVENTION

The present invention aims to overcome these drawbacks and to create a machining device that allows a very low energy fine or superfine surface finishing process, of high quality and reliability, to be obtained. The machining device is characterized in this respect by the fact that it comprises at least one capacitive element, arranged inside one or both of the machining heads, preferably close to or within the contacts located between said electrical circuit and the tool electrode, connected in series between the source and one of the poles of the machining gap and whose characteristics are such that it prevents the DC components of the electrical pulses coming from the source being applied across the machining gap and to allow the variable current components coming from the source to flow and such that it reduces the total capacitance of said electrical circuit with respect to the machining gap.

Thanks to these characteristics, it is possible to reduce the energy of the eroding discharges in a very effective but simple manner. In this way, fine and superfine surface finishing processes of very high quality are obtained. In addition, the production cost of the device is moderate and its construction not very complex.

Advantageously, the machining device comprises a first capacitive element connected in series between a first pole of the first source and the tool electrode and a second capacitive element connected in series between a second pole of the first source and the workpiece electrode.

The reduction in discharge energy is thus particularly significant.

According to a preferred embodiment, the capacitive element is arranged as close as possible to one of the poles of the machining gap, preferably near to or within the contacts located between said electrical circuit and the tool electrode.

These features allow an even further reduction in the energy of the eroding discharges so as to obtain an excellent superfine surface finishing process.

Advantageously, the tool electrode is a wire and the capacitive element is formed by a wire guide one part of which, in contact with the wire, is made of insulating material and another part of which is made of conducting material.

A capacitive element that is particularly effective and close to the electrode wire can thus be obtained ensuring that the eroding discharges have a very low energy level.

Advantageously, the first source comprises a short-circuiting device for producing electrical pulses with steep voltage rising edge slopes.

This first source can be configured so as to produce electrical impulses with a frequency in the range 0.1 to 10 MHz, with a voltage amplitude in the range 60 to 300 V and with a positive or negative voltage rising edge slope in the range 0.2 to 5 V/nS.

These features ensure an efficient initiation of the eroding discharges, despite the presence of at least one capacitive element mounted in series within the electrical circuit.

According to a preferred embodiment, the energy reduction device comprises a self-inductance element galvanically connected to the two poles of the machining gap.

Thanks to these features, the mean voltage measured across the terminals of the gap can be maintained at zero. Electrolytic phenomena, detrimental to the process, are thus avoided.

Advantageously, the inductance value of said self-inductance element is chosen such that the resonance frequency of the electrical circuit is small relative to the frequency of the electrical pulses of the first source.

According to a particularly favorable embodiment, the energy reduction device comprises an adjustable DC voltage source connected in series with the self-inductance element between the two poles of the machining gap.

This source allows the mean voltage measured across the terminals of the gap to be adjusted to a given value. Controlled electrolytic depositions and coloration processing of the sawn workpiece are thus made possible.

In addition, the quality of the superfine finishing process can be further improved.

BRIEF DESCRIPTION OF THE DRAWINGS

Other advantages become apparent from the features expressed in the dependent claims and from the description hereinafter presenting the invention in more detail with the aid of drawings that show, schematically and by way of example, embodiments and variants.

DETAILED DESCRIPTION

Figure 1:
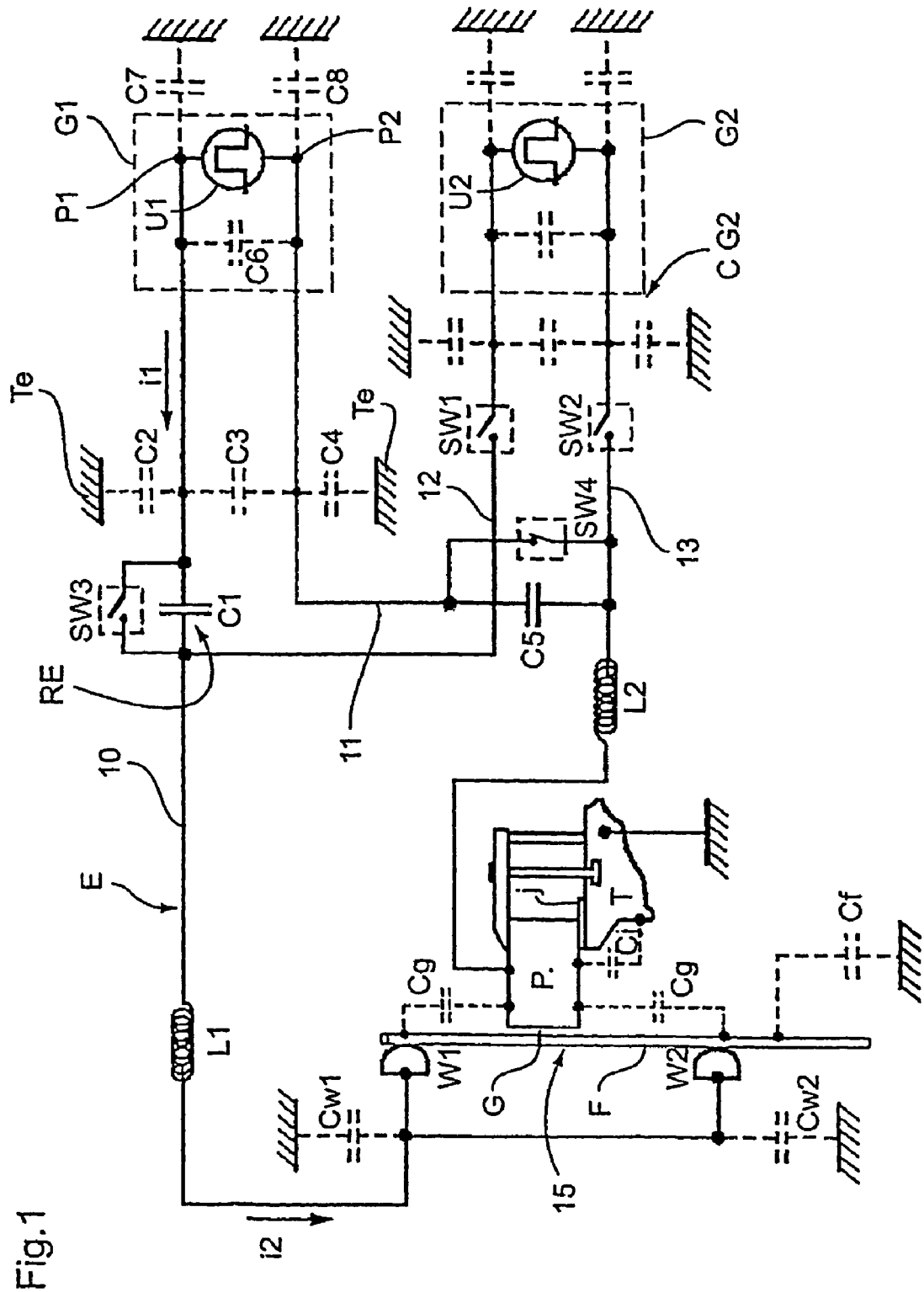
FIG. 1 shows a circuit diagram of a first embodiment.

The first embodiment of the machining device illustrated in FIG. 1 comprises a first source of voltage/current U1 integrated within a first machining generator G1 connected by an electrical circuit E to a tool electrode F via a first line 10 and to a workpiece electrode P via a second line 11.

A second source U2 integrated within a second machining generator G2 is connected via a third line 12 to the tool electrode F and via a fourth line 13 to the workpiece electrode P.

The first generator G1 is designed to cause the initiation of the discharges between the tool electrode F and the workpiece electrode P and delivers lower powers than the second generator G2 which delivers the power of the most erosive discharges and sustains the latter.

Two switches SW1 and SW2 disposed in the lines 12 and 13 allow the second generator G2 to be disconnected from the tool electrode F and from the workpiece electrode P when it is desired to carry out a fine or superfine surface finishing process.

Here, the tool electrode is a wire F unwound from a feeder reel, not shown, and taken up within a recovery device, not shown, but known per se. Within a machining region 15, there thus exists a machining interval or gap G between the wire electrode and the workpiece electrode, across which the eroding discharges are initiated. The wire F is in galvanic contact with the lines 10 and 11 thanks to a first and a second contact W1 and W2.

The elements L1 and L2 represent the self inductances of the two lines 10 and 11.

The workpiece electrode P is fixed onto a holder T via an insulating element J, for example a support plate made of plastic material. The wire F and the holder T can be displaced relative to one another in order to cut out the workpiece P by electrical discharge machining according to a given geometrical configuration.

According to the invention, the machining device comprises an energy reduction device RE designed to reduce the energy of the eroding discharges for fine machining.

This device RE comprises at least one capacitive element C1 connected between the first generator G1 and the machining gap G whose characteristics are such that it prevents the DC components of the electrical pulses coming from the first generator G1 from being applied to the machining gap G and to allow the variable current components coming from the first generator G1 to flow across the machining gap. Thus, the total capacitance of the electrical circuit E with respect to the gap G is greatly reduced.

In the first embodiment, this capacitive element is formed by a capacitor C1 with a value that can be as high as 0.1 µF but is typically in the range 0.1 nF to 1 nF, arranged in the first line 10. A switch SW3 allows the capacitor C1 to be short-circuited when it is desired to increase the energy of the eroding discharges.

Another capacitive element, in the form of a second capacitor C5 of low value, can be arranged in the second line 12 in order to reduce the energy of the eroding discharges still further. This second capacitor C5 can be short-circuited by way of a switch SW4. Its value is advantageously within the range 0.1 nF to 1 nF.

The machining device thus exhibits the following stray capacitances:

The stray capacitances associated with the second rough-cut generator G2 and with the lines 12 and 13 indicated as a total by C G2, these capacitances C G2 being disconnected from the gap when the two switches SW1 and SW2 are open;

C2 being the stray capacitance of the first line 10 with respect to ground Te;

C3 being the stray capacitance between the lines 10 and 11;

C4 being the stray capacitance of the second line 11 with respect to ground Te;

C6 being the internal stray capacitance of the first generator G1;

C7 being the stray capacitance of a first pole P1 of the first source U1 with respect to ground Te;

C8 being the stray capacitance of a second pole P2 of the first source U1 with respect to ground Te;

CW1 being the stray capacitance in the vicinity of the first contact W1 with respect to ground;

CW2 being the stray capacitance in the vicinity of the second contact W2 with respect to ground;

Cj being the capacitance between the workpiece electrode P and the holder T;

Cf being the stray capacitance between the wire and ground; and

Cg being the capacitance of the gap G between the tool electrode F and the workpiece electrode P.

In FIG. 1, the low-value capacitor C1 connected in series in one of the two lines of the generator G1 is a simple means of attenuating the effect of the stray capacitances C3 and C6 on the machining process. The charge accumulated in C3 participates in the machining process by following the path C3, C1, L1, W1 and W2, F, P, L2, SW4, C3. The equivalent capacitance is C1*C3/(C1+C3)<C1. The same reasoning can be applied to the stray capacitance C6.

The charges of the stray capacitances CW1+CW2+Cf+C2+C7 would be able to add together and participate in the eroding discharge, but are attenuated by the capacitance Cj. It must be noted here that Cj and the insulating plate J form the simplest device that allows the effect of Cf, in particular, to be limited, which is the stray capacitance attached to the wire and to the whole of its unwinding and recovery system. In the case of some machines where the worn wire is stored directly in the machining bin, Cf can reach high values.

If the switch SW4 is conducting, then the stray capacitances C8+C4+Cj add their charges that can cross the gap by finding a path to ground Te via the capacitance equivalent to CW1+CW2+Cf+C2+C7. The low-value capacitor CS connected in series in the other line 11 of the generator G1 is designed to attenuate this latter discharge energy and is described in more detail herein below. FIG. 1 shows the capacitor CS short-circuited by the switch SW4, hence inactive in this example.

The effect of the capacitances Cg distributed within the machining gap cannot be attenuated by placing any kind of capacitor in the discharge circuit since their charges cross the gap by the shortest possible route. The only known means allowing the value of these distributed capacitances to be influenced would be to use a different dielectric liquid, for example oil in place of water, or else to modify the geometry of the air gap or machining gap.

FIGS. 2a, 2b, 2c, 2d, 2e and 2f will clarify how each of the capacitances in FIG. 1 combine together with the others with respect to the machining gap G.

Figure 2A:
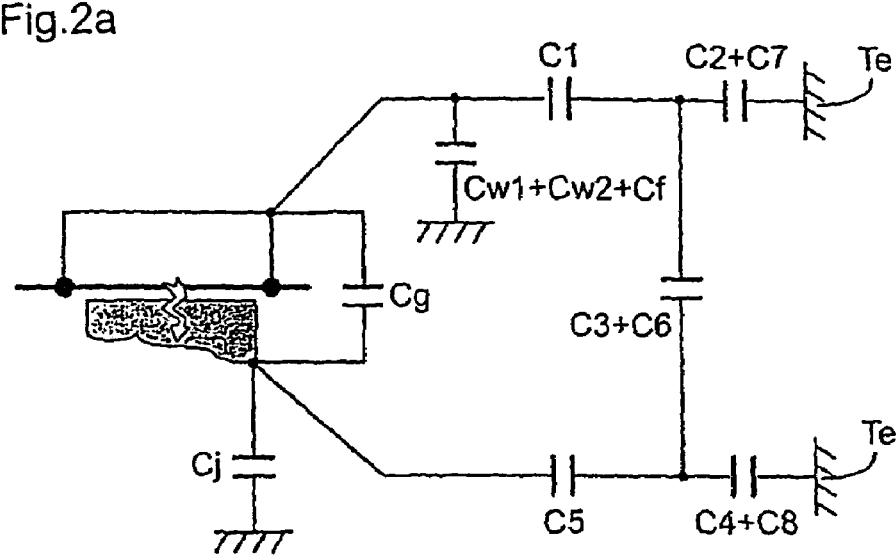
FIGS. 2a to 2f illustrate progressive simplifications of the circuit diagram in FIG. 1 progressively combining the capacitances of this circuit diagram.

FIG. 2a is a first simplification of FIG. 1, in which only the machining gap and the various groups of capacitances capable of participating in the machining process and their connections to ground are represented.

Figure 2B:
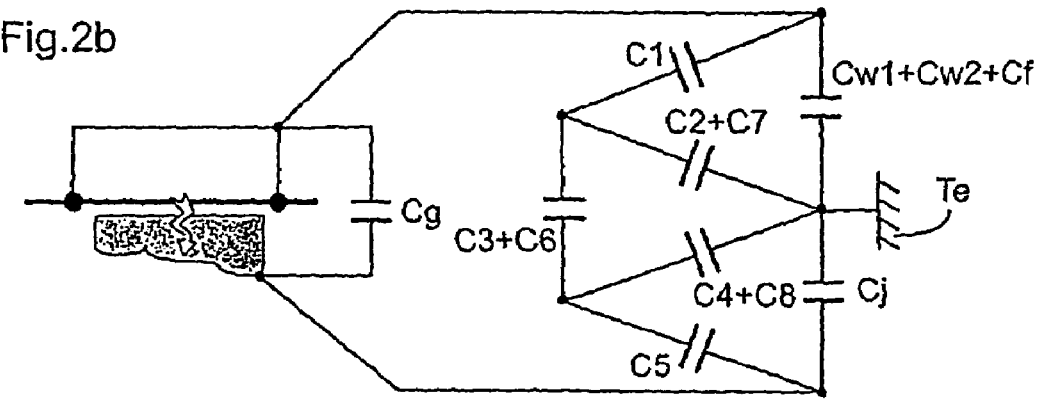

FIG. 2b brings the connections to ground to a single point Te and allows the respective roles played by the capacitances Cj, C1 and C5 to be seen which are used to attenuate the energy of all of the distributed stray capacitances.

Figure 2C:
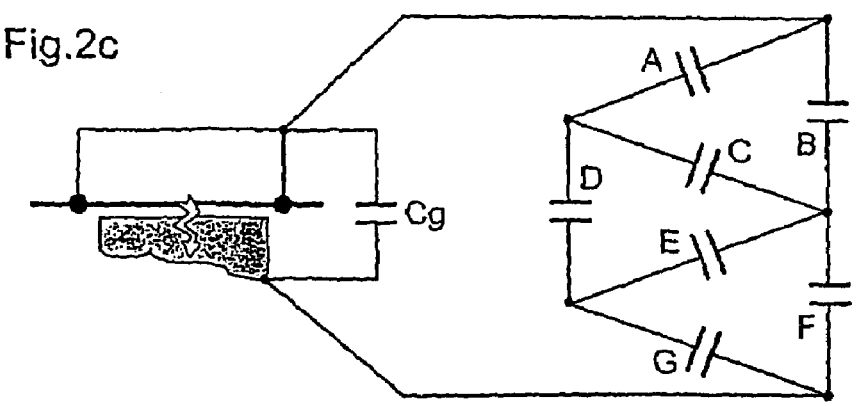

FIG. 2c illustrates a simple change of variable.

$$A=C1$$

$$B=CW1+CW2+Cf$$

$$C=C2+C7$$

$$D=C3+C6$$

$$E=C4+C8$$

$$F=Cj$$

$$G=C5$$

Figure 2D:
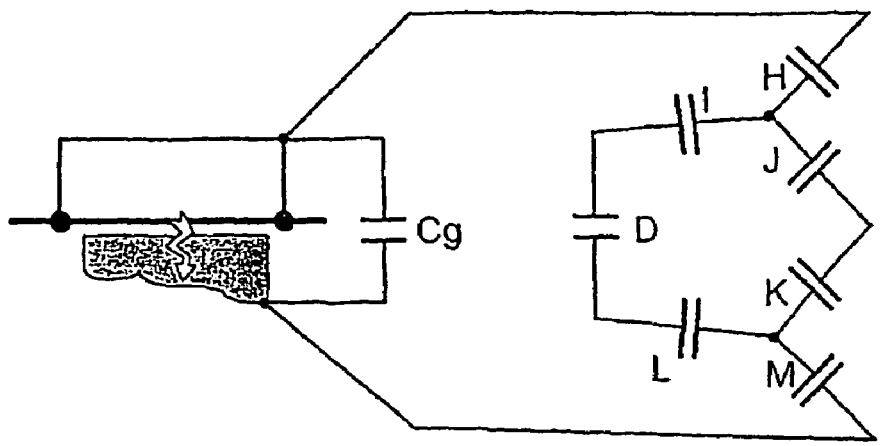

FIG. 2d illustrates the passage from the configuration of the capacitances in a triangle toward the configuration of the capacitances in a star for the group of the capacitances ABC and the group of the capacitances EFG, with the following equalities:

$$H=(A*B+A*C+B*C)/C$$

$$I=(A*B+A*C+B*C)/B$$

$$J=(A*B+A*C+B*C)/A$$

$$K=(E*F+E*G+F*G)/G$$

$$L=(E*F+E*G+F*G)/F$$

$$M=(E*F+E*G+F*G)/E$$

Figure 2E:
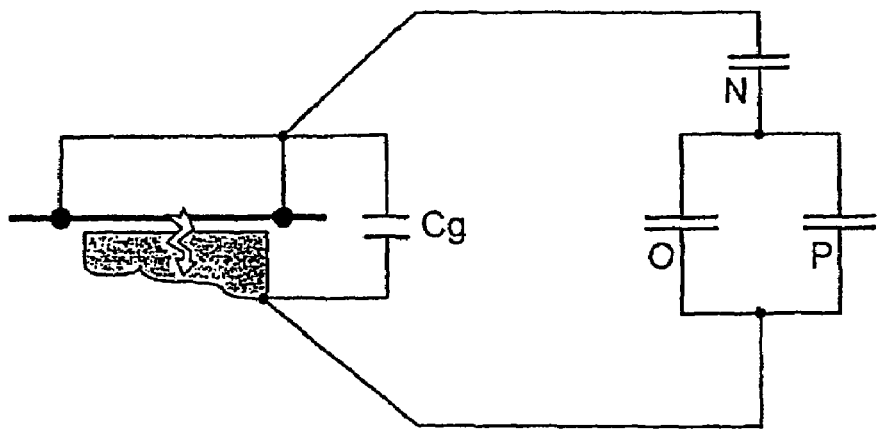

According to FIG. 2e it appears that $$1/N=(1/H)+(1/M)$$

$$1/O=(1/I)+(1/D)+(1/L)$$

$$1/P=(1/J)+(1/K)$$

Figure 2F:
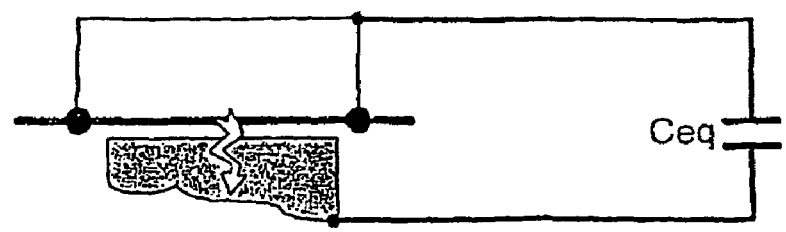

And, according to FIG. 2f, the total equivalent capacitance Ceq of all machining devices can be determined by the equation $$Ceq=Cg+(N+O+P)/(O*N+P*N)$$

The capacitors C1 and C5 complete the attenuation produced by the capacitance Cj. In order to appreciate the respective roles of C1, C5 and Cj, the usual numerical values of the various stray capacitances that must be taken into account will hereinafter be considered. The self inductances L1 and L2 of the lines 10, 11 of around 500 nH are not considered during this evaluation which uses the following numerical values:

C1 or C5: 0.5 nF

Cj: 0.1 to 10 nF depending on the dimensions of the workpiece to be machined

C2+C7: 5 nF

C4+C8: 5 nF

C3+C6: 100 nF

CW1+CW2+Cf: from 1 to 5 nF

Cg: 0.5 nF

| Application variant of the circuit: | C1 | C5 | Cj | Ceq (FIG. 2f) |
|---|---|---|---|---|
| 1. | 0.5 nF | 0.5 nF | 10 nF | 4.10 nF |
| 2. | 0.5 nF | short-circuit | 10 nF | 4.98 nF |
| 3. | 0.5 nF | 0.5 nF | short-circuit | 5.97 nF |
| 4. | 0.5 nF | short-circuit | short-circuit | 6.00 nF |
| 5. | short-circuit | 0.5 nF | 10 nF | 6.94 nF |
| 6. | short-circuit | 0.5 nF | short-circuit | 15.71 nF |
| 7. | short-circuit | short-circuit | 10 nF | 106.5 nF |
| 8. | short-circuit | short-circuit | short-circuit | 110.5 nF |

The calculations have been carried out for the values Cj=10 nF and CW1+CW2+Cf=5 nF.

According to line 7 of the above table, compared to line 8, it can be seen that the introduction of only an insulating plate J between the workpiece P and its holder T does not provide a substantial improvement, in comparison with line 4, where the surprising effect of the capacitor C1 alone becomes apparent; the equivalent capacitance applied to the machining gap is now divided by 18, see lines 4 and 8.

Line 6 shows that the capacitor C5 alone is less effective than the capacitor C1 alone (line 4); here, the equivalent capacitance is divided by 7.

The higher the value of the stray capacitances C3+C6, the more determining is the effect of the capacitor C1, as can be seen below from eight other variants in the use of the circuit with C3+C6=20 nF, instead of 100 nF in the previous table.

| Variant | C1 | C5 | Cj | Ceq (FIG. 2f) |
|---|---|---|---|---|
| 1a | 0.5 nF | 0.5 nF | 10 nF | 4.10 nF |
| 2a | 0.5 nF | short-circuit | 10 nF | 4.91 nF |
| 3a | 0.5 nF | 0.5 nF | short-circuit | 5.97 nF |
| 4a | 0.5 nF | short-circuit | short-circuit | 6.00 nF |
| 5a | short-circuit | 0.5 nF | 10 nF | 6.74 nF |
| 6a | short-circuit | 0.5 nF | short-circuit | 14.81 nF |
| 7a | short-circuit | short-circuit | 10 nF | 26.5 nF |
| 8a | short-circuit | short-circuit | short-circuit | 30.5 nF |

The comparison of lines 4a and 7a confirms, however, the greater effectiveness of the capacitor C1 alone with respect to that of the capacitance Cj alone, especially as in some cases it will be difficult to decrease the value of the capacitance Cj owing to the dimensions of the workpiece to be machined. The comparative calculations may of course be extended as far as is desired by applying the method detailed herein above.

In the presence of a very high stray capacitance of the wire electrode Cf (for example more than 20 nF), there will again be an advantage in introducing the capacitance Cj associated with the capacitor C1, and not the latter alone.

For clarity in FIG. 1, the capacitors C1 and C5, together with the associated switches SW3, SW4, have been shown in the center of this FIG. 1 and on each of the two lines connecting the first generator to the machining gap G. After the above demonstration, it will be clearly apparent that these two capacitors C1 and C5 will gain in effectiveness if they can be installed as close as possible to the machining region 15, in other words the capacitor C1 as close as possible to the machining contacts W1, W2, and the capacitor C5 as close as possible to the workpiece to be machined P.

Figure 2G:
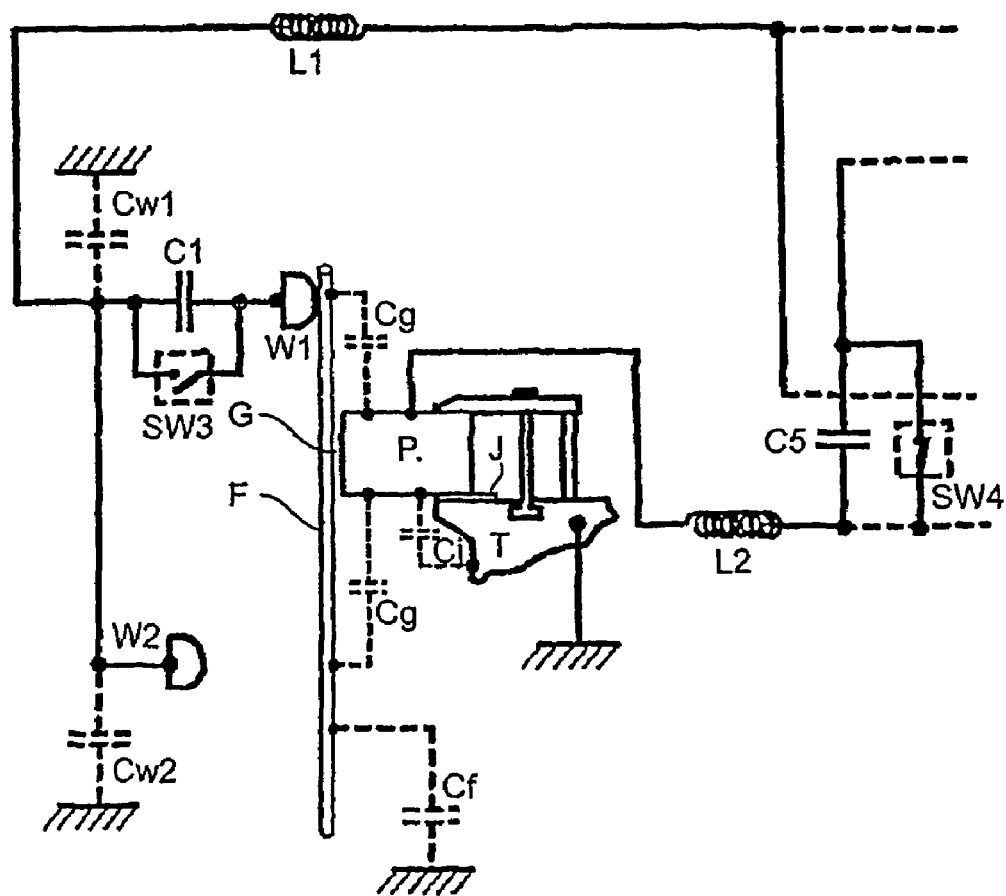
FIGS. 2g and 2h are partial circuit diagrams of variants of that in FIG. 1.

For example, the capacitor C1 can be installed between CW1 and W1 inside the upper machining head (FIG. 2g), the machining contact W2 inside the lower machining head being in the retracted position is no longer in contact with the wire. In this way, the energy contained in the stray capacitances CW1 and CW2 will thus also be attenuated.

Figure 2H:
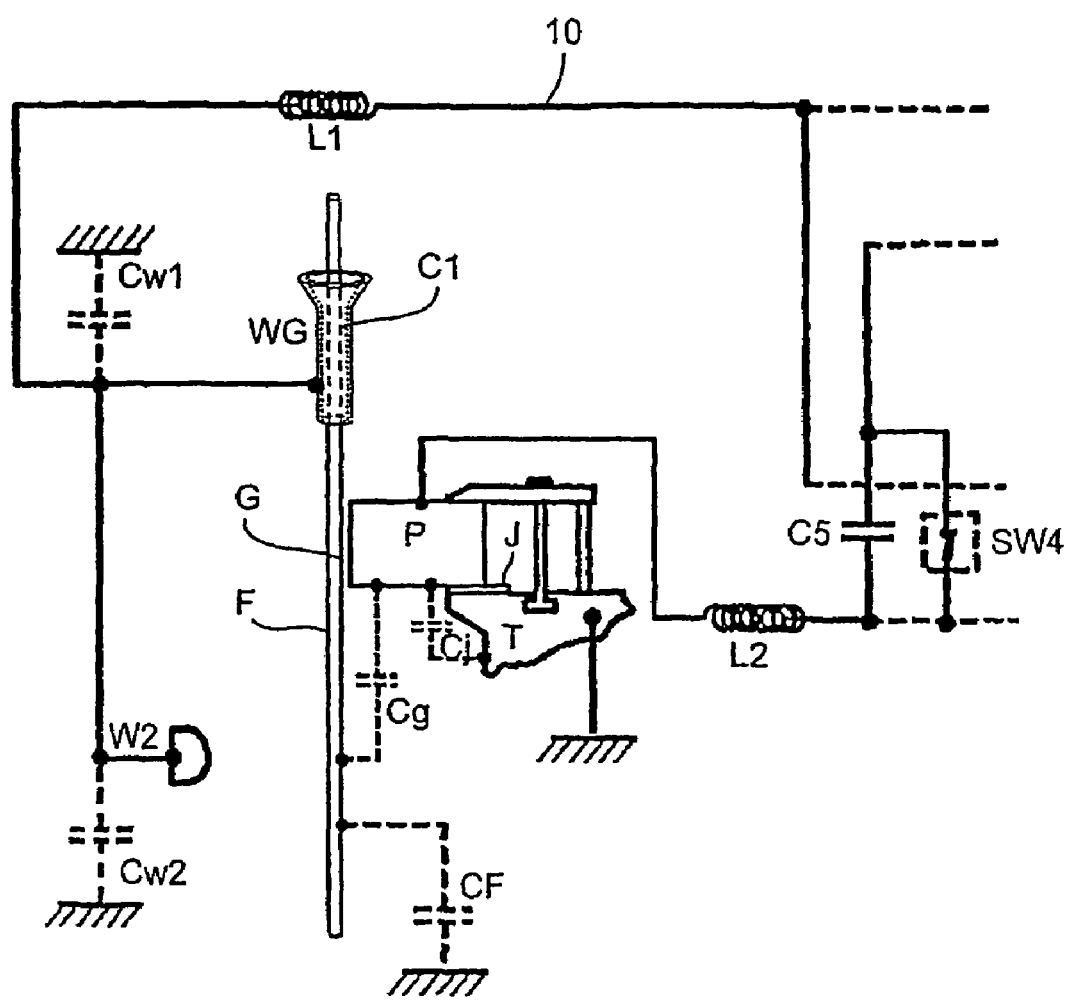

If the principle described above is pushed to its limits, the maximum effectiveness of the capacitor C1 is obtained by replacing the contact W1 by a cylindrical collar made of insulating material which will act as a capacitance connected in series in a line leading from the first generator G1 to the gap G. The electrode wire F will be guided within the cylindrical collar. FIG. 2h shows the electrode wire F guided inside an insulating ceramic cylinder WG above which a cone is mounted in order to facilitate the entry of the wire. The exterior of said cylinder is covered by a conducting surface, for example made of copper, galvanically connected to one of the poles of the generator G1. The lower machining contact W2, in the retracted position, does not make contact with the wire. In this latter embodiment, the capacitor C1 in the form of a cylinder is situated around the electrode wire F.

Electronic component manufacturers frequently use industrial ceramics whose dielectric strength is 20 kV/mm at 25° C. and at a frequency of 1 MHz. The dielectric constant $\in r$ of these ceramics can normally go from 20 to 100. For special applications, values of $\in r$ greater than 100 and up to 12,000 can be found, for example with ceramics based on titanates of strontium, barium, etc., which have dielectric strengths in the range from 50 to 300 V/mm.

For an electrode wire 0.250 mm in diameter, an insulating cylindrical guide of internal diameter equal to 0.260 mm with a ceramic of dielectric constant $\in r=100$ can be designed for example. With a thickness of ceramic equal to 0.1 mm, such a cylindrical guide of around 50 mm in length would give a capacitance of 0.5 nF and would withstand an overvoltage of 2 kV.

In this type of capacitive element, the latter is arranged as close as possible to one of the poles of the machining gap G, preferably close to or within the contacts W1 or W2 situated between the electrical circuit E and the tool electrode. This capacitive element can be formed by a wire guide WG one part of which, in contact with the wire F, is made of an insulating material and another part of which, connected to the electrical circuit, is made of conducting material.

In summary, the introduction of capacitor C1 and (or) C5 in series in the discharge lines 10, 11 from the generator G1, and as close as possible to the machining gap G, therefore allows the energy of the discharges in superfine surface finishing mode to be reduced, in comparison with a solution where solely an insulating plate would be introduced between the workpiece and its holder and where the current feed lines from the rough-cut generator G2 would be disconnected, as described in EP 1 193 016 A2.

However, in this case, it becomes necessary to take into account the fact that the presence of the low-value capacitors C1 or C5 in series in the electrical circuit leads to the disappearance, within the gap, of the DC component of voltage delivered by the discharge initiation generator G1. As a result, the probability of initiating a discharge is then considerably reduced which leads to a decrease in the machining efficiency in fine surface finishing mode.

In order to correct this idiosyncrasy, the invention proposes that the operation of the discharge initiation generator G1 be modified. Traditionally, the initiation generator applies a sufficiently high voltage for a relatively long time until the discharge initiation occurs. However, experience has shown that, in electrical discharge machining, the initiation can also be caused by a very rapid increase in the electric field across the terminals of the machining gap. In the present machining case, positive or negative increases in voltage of a few V/nS, in other words of around 0.1 to 5 V/nS, applied to the gap terminals result in a high probability of triggering an eroding discharge, given the stochastic nature of the discharge initiation phenomenon.

In order to take advantage, according to the present invention, of said discharge initiation phenomenon triggered by rapid voltage rises, the generator G1 will need to produce aggressive voltage/current pulses by preferably choosing a repetition frequency in the range from 0.1 to 10 MHz. The value of 1 MHz has been taken by way of example in the case illustrated by FIGS. 3a and 3b.

Figure 3A:
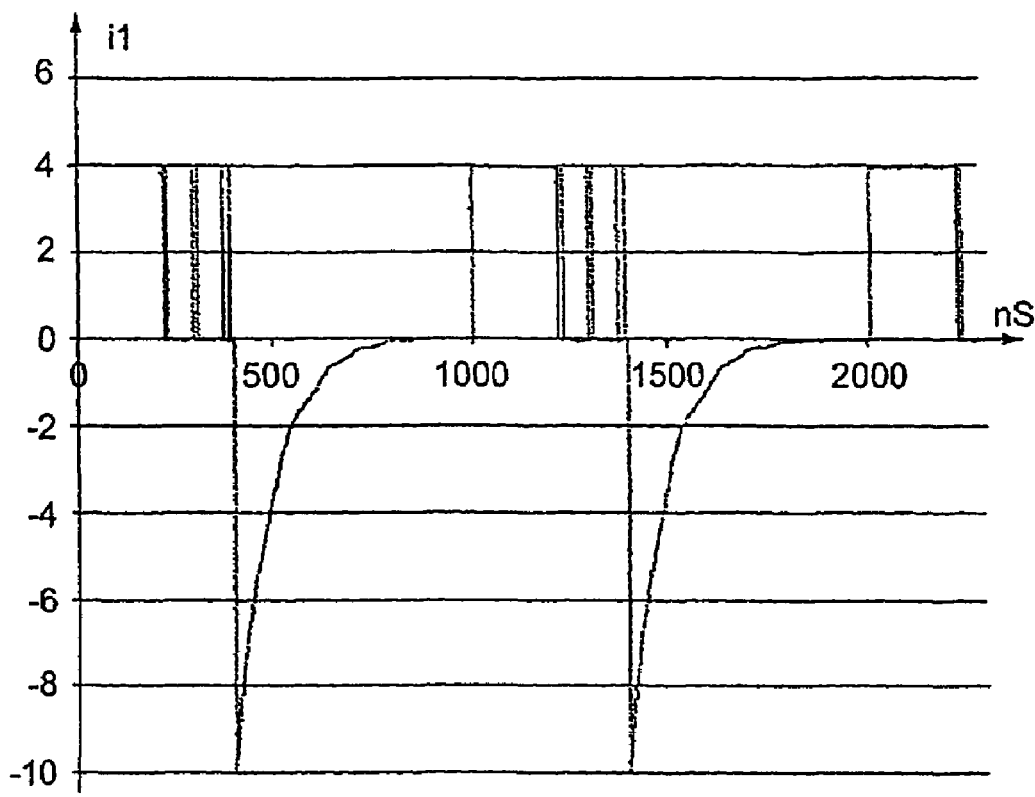
FIGS. 3a and 3b are diagrams of the current and of the voltage at the output of the first generator which is the discharge initiation generator.
Figure 3B:
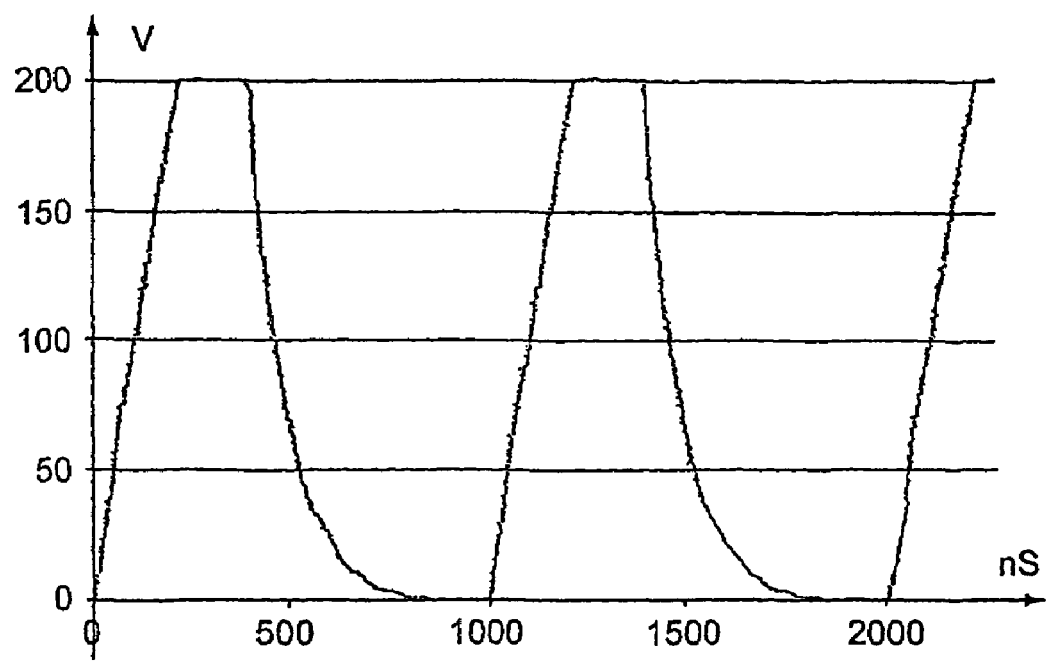

FIG. 3a is a diagram of the current i1 at the output of the generator G1 as a function of time (nS). FIG. 3b is a diagram of the voltage V at the output of the generator G1 applied to the distributed stray capacitances of the line, symbolized by C2, C3, C4 (FIG. 1) hereinafter referred to as the line capacitances.

The generator G1 is capable of delivering signals of amplitude from 60 to 300 V, for example 200 V in the example illustrated here.

As can be seen in FIGS. 3a and 3b, at the beginning of the signal the voltage across the terminals of the line capacitances is zero. The signal begins with a current step of 4 A which starts to charge up these line capacitances. As long as the voltage at the output of the generator G1 is below 200V, the current is maintained at 4 A. When the output voltage becomes higher than 200 V, the current ceases and is then re-established so as to maintain a voltage of 200 V. After a first pre-determined duration counting from the beginning, hereafter 400 nS, the line capacitances are short-circuited through an ohmic resistance, of 20 Ohms in this example, which results in the appearance of a negative current peak of 10 A which will abruptly discharge the line capacitances. The short-circuiting device not shown in FIG. 1 is, in the embodiment described, formed by a bridge using 4 MOSFET transistors IRFP 22N 50A from the manufacturer 'International Rectifier'.

The line capacitances thus discharge rapidly and a +4 A current is again delivered at the start of the next signal, after a second pre-determined period which lasts 1000 nS here.

The current/voltage characteristics described here are only given by way of example. It will of course be understood that other devices allowing rapid rises in voltage to be generated across the terminals of the machining gap may be designed.

Figure 4A:
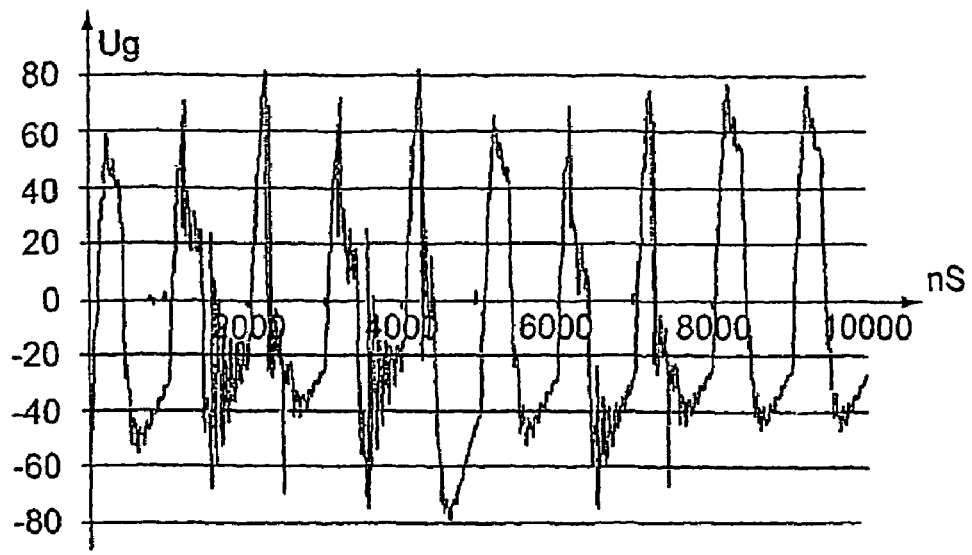
FIGS. 4a, 4b and 4c show diagrams of the instantaneous voltage, of the current and of the mean voltage at the machining gap G.
Figure 4B:
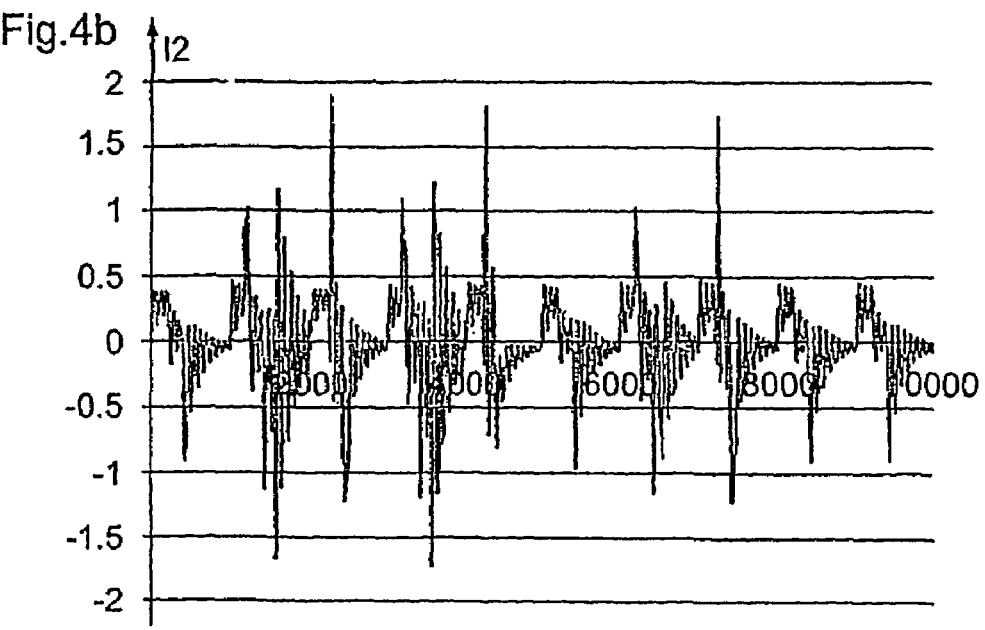
Figure 4C:
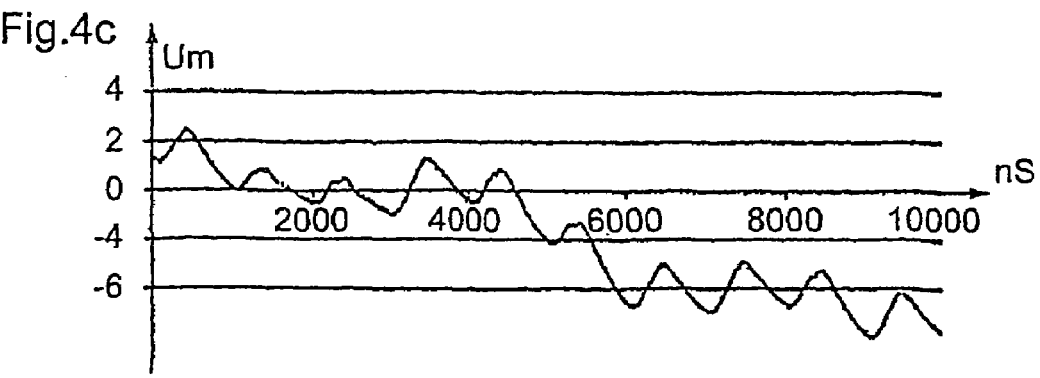

As can be seen in FIGS. 4a, 4b, 4c, this mode of excitation produces short, non-calibrated, discharges of around 100 nS in the gap G, that are caused by the rapid transients of the current/voltage signal delivered by the generator G1. FIG. 4a shows the instantaneous voltage Ug (Volts) across the terminals of the gap as a function of time (nS). FIG. 4b is the current i2 across the machining gap G. The discharge initiation points coincide with the peaks in current i2 greater than about 1 A and lower than about −1 A.

Since a capacitor C1 has been placed in series in the discharge circuit, it follows from this that the mean of the current i2 (FIG. 4b) delivered to the gap is zero. Consequently, if the gap could be reduced to a simple ohmic impedance, the mean voltage across its terminals would also be zero. This is not the case, as is shown in the corresponding FIG. 4c calibrated in Volts, the measurement having been carried out with an RC filter of 10 μS. In FIG. 4c, it can be seen that the mean voltage Um fluctuates, for example from +2 V to −6 V in this particular case owing to the irregularity of the discharge initiation processes.

Since the discharge initiation is a random process, as can be seen, the mean voltage can vary over a range of around + or −8 Volts, for example here within a time interval of less than 10 periods. Here can clearly be seen another idiosyncrasy associated with the presence of a capacitor in series in the discharge circuit of the generator G1. This means that it is no longer possible to impose a mean voltage of zero across the terminals of the gap as can currently be frequently practiced on electrical discharge machining systems using a wire.

The fluctuations in the mean voltage Um can generate electrolysis phenomena that are well known to those skilled in the art. The crystalline integrity of certain metals or alloys in the workpiece to be machined may be altered when the mean voltage is not maintained close to zero volts across the terminals of the gap. This is especially the case with some varieties of tungsten carbide which can crumble under the effect of the electrolysis currents.

Figure 5:
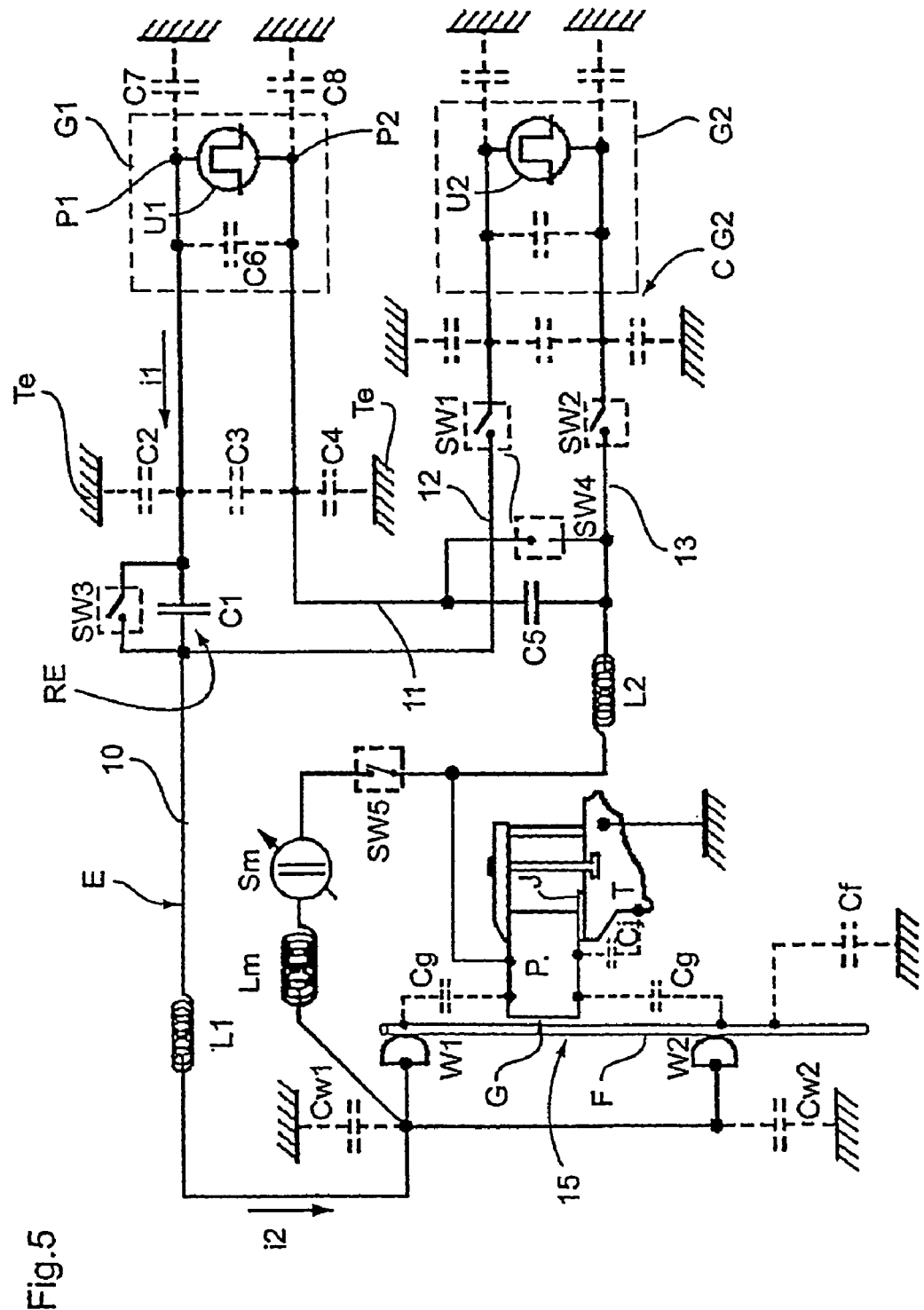
FIG. 5 shows the circuit diagram of a second perfected embodiment.

The present invention proposes a means of eliminating the drawback described above with reference to the embodiment illustrated in FIG. 5. The solution consists in connecting a self-inductance element Lm, for example in the form of a high-value inductance coil, in series with an adjustable DC voltage source Sm across the terminals of the gap.

The embodiment in FIG. 5 is, in its other features, identical to that in FIG. 1. The same components and elements are therefore denoted by the same reference numbers.

The new elements are the inductance coil Lm in series with the adjustable DC voltage source Sm connected across the terminals of the gap, namely to the machining contacts W1, W2 and to the workpiece P, together with a switch SW5 allowing the inductance coil Lm and the voltage source Sm to be disconnected from the gap such that the mean voltage Um across the terminals of the gap fluctuates freely.

Figure 6:
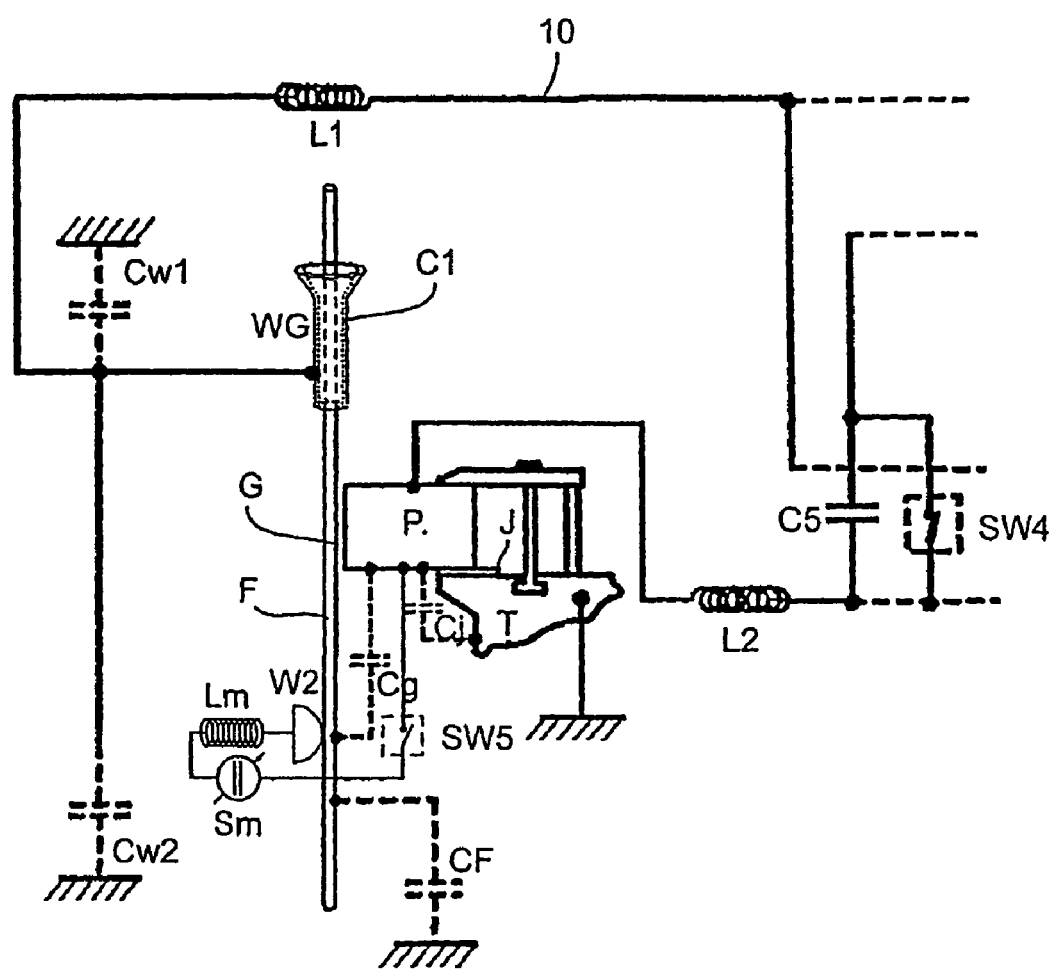
FIG. 6 illustrates a partial circuit diagram of a variant of this second embodiment.

The holder T is connected to ground, whereas the workpiece P will be at a floating potential owing to the insulating plate J which generates a capacitance Cj between the workpiece and the holder. This detail is unimportant in regard to the invention. Whether the workpiece P is connected to ground or not, in other words whether the insulating plate J is present or not, the inductance coil Lm in series with the voltage source Sm must be galvanically connected, on the one hand, to the workpiece P and, on the other, to the tool electrode or to the machining contacts W1, W2 in order to impose a constant mean voltage Um across the terminals of the gap. The same remark also applies to the device illustrated in FIG. 2h where the capacitor C1 is placed around the wire in the form of a guide made of insulating material. If the inductance coil Lm in series with the voltage source Sm, were connected in this latter configuration, then the contact W2, shown in the retracted position in FIG. 2h, would again need to be in contact with the electrode wire F, but this contact W2 would not then need to be connected to the line 10, but to the workpiece P via the elements Lm, Sm and SW5, as is illustrated in FIG. 6.

The self-inductance element Lm must be of a sufficiently large value so that the resonance frequency of the electrical circuit:

$$Fo = \frac{1}{2\pi} \cdot (Lm \cdot Ceq)^{1/2}$$

is low with respect to the excitation frequency of the electrical pulses from the discharge initiation generator G1, typically 100 times lower.

The value of this self-inductance element Lm is chosen such that the ratio between the excitation frequency of the generator G1 and the frequency of the electrical circuit is in the range 10 to 500, preferably between 50 and 150.

For example, with an excitation frequency of 1 MHz for the generator G1, as chosen herein above, and Ceq=5 nF, the resonance frequency would be obtained with an inductance of 5 μH. It is therefore advisable, in this case, to use a self inductance of minimum value 500 μH and up to 10 mH.

The relatively high value of the inductance coil Lm means that the average voltage across the terminals of the gap cannot vary too rapidly. If the inductance coil Lm comprises an ohmic impedance that is low compared to that of the gap, with Lm=5 mH and Ceq=5 nF for example, the adjustable DC voltage source Sm will impose its voltage across the terminals of the gap after a delay of around 30 μS from the moment said coil Lm is connected across the gap G. Subsequently, if the machining conditions change abruptly, for example following variations in the discharge initiation frequency or in the resistance of the gap, the average voltage will undergo a brief fluctuation, in other words of a duration less than 30 μS, before recovering the value of the voltage Um (Volt) from the adjustable DC voltage source Sm.

Figure 7A:
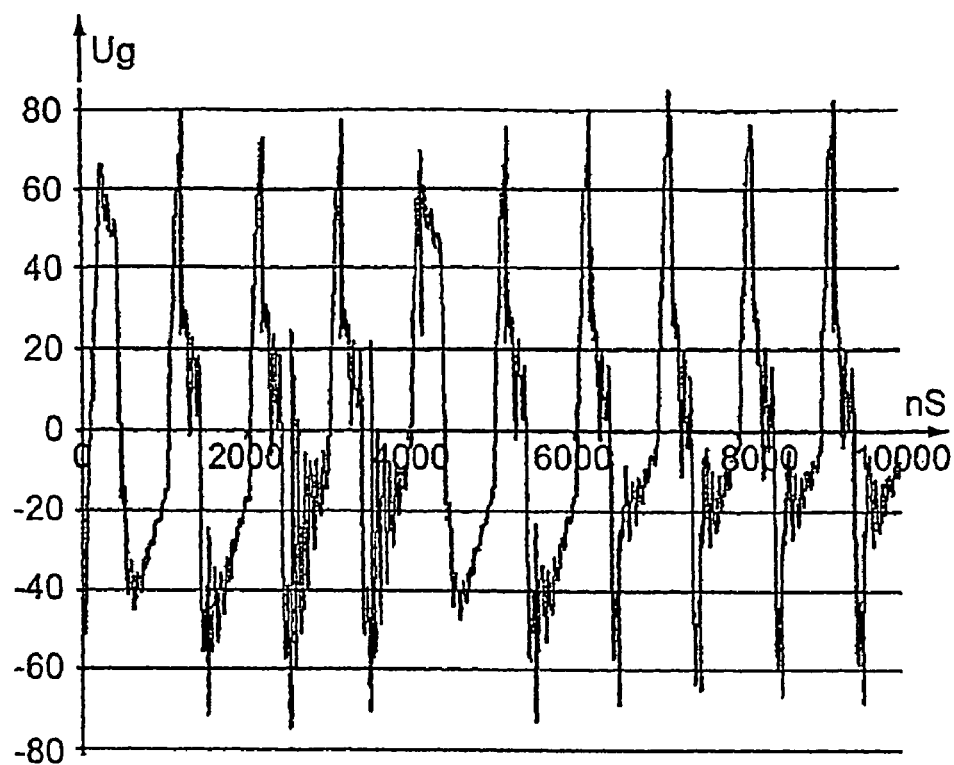
FIGS. 7a and 7b illustrate diagrams of the instantaneous and mean voltage across the terminals of the machining gap for the second embodiment.
Figure 7B:
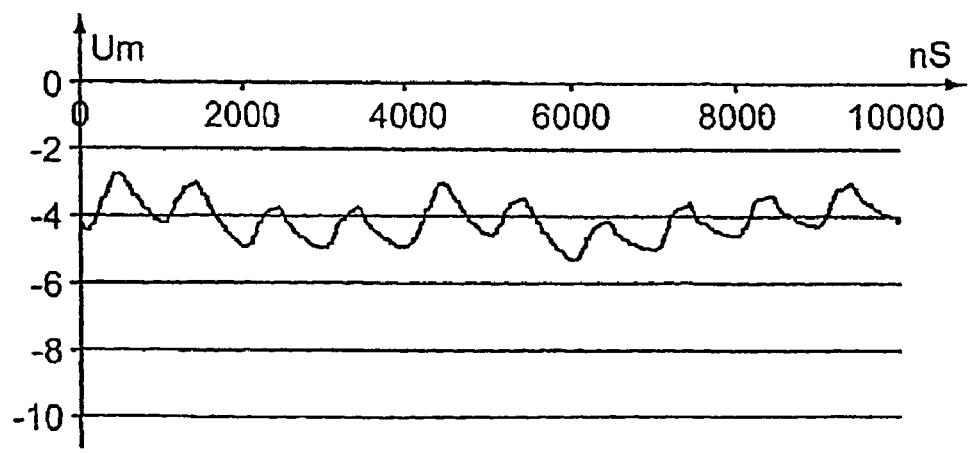

FIGS. 7a and 7b show the instantaneous voltage Ug and mean voltage Um with Sm adjusted to −4 V. A mean voltage close to −4 V is maintained across the terminals of the machining gap despite sporadic discharge initiation events.

It is important to note that the inductance coil Lm across the terminals of the gap does not alter the rapid voltage transients that allow the initiation of the eroding discharges. With this device, surface treatments depending on the materials of the electrodes present may be envisioned by applying mean voltages across the terminals of the gap G of a few Volts, positive or negative. The surface of the workpiece P could thus be coated with a metallic thin film by electrolysis and could be treated by a coloration process.

The above solution is particularly simple. The replacement of the inductance coil Lm by a resistor of high value of the order of 10 kohm may for example be imagined. With the resistance of the gap of 0.5 to 2 kohm, a potential divider is created that transmits a fraction of the voltage Um across the terminals of the gap. The drawback of such a device is that a regulation control loop would have to be installed within it: in other words, continuously monitoring the voltage across the terminals of the gap and controlling the output voltage of the source Sm as a function of the random fluctuations in the machining process. On the contrary, the induction coil Lm does not require any regulation loop.

In order to disconnect this device for regulating the mean voltage Um, the switch SW5 is opened. This allows the system to return to an operation where the mean voltage across the terminals can be left free to fluctuate.

Finally, not controlling the mean voltage across the terminals of the gap makes it impossible to predict in which polarity the discharges will strike; positive or negative. Indeed, it is still possible, at constant power, to improve the surface condition if the initiation of the discharge in positive polarity mode is promoted or, at the very least, if the energy of the discharges striking in negative polarity mode can be reduced.

Figure 8A:
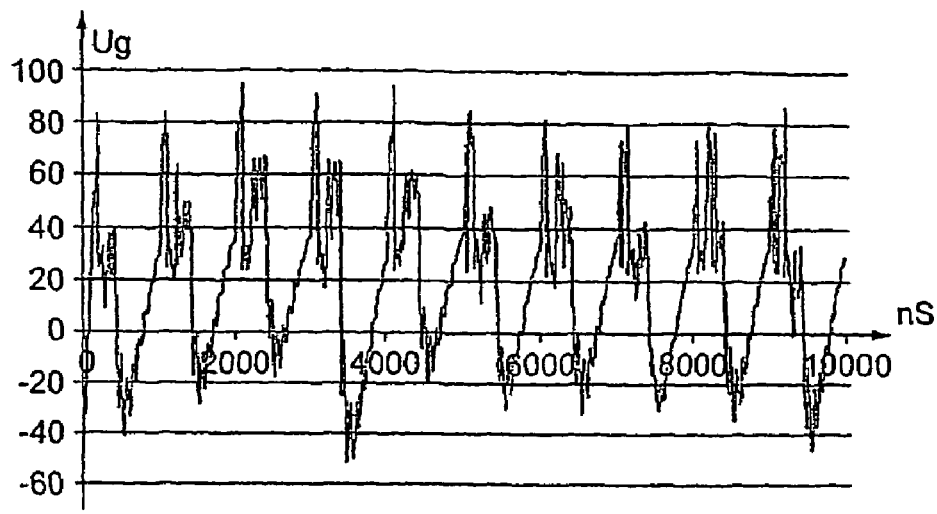
FIGS. 8a, 8b and 8c show other diagrams of the instantaneous voltage, of the current and of the mean voltage across the terminals of the gap for the second embodiment.
Figure 8B:
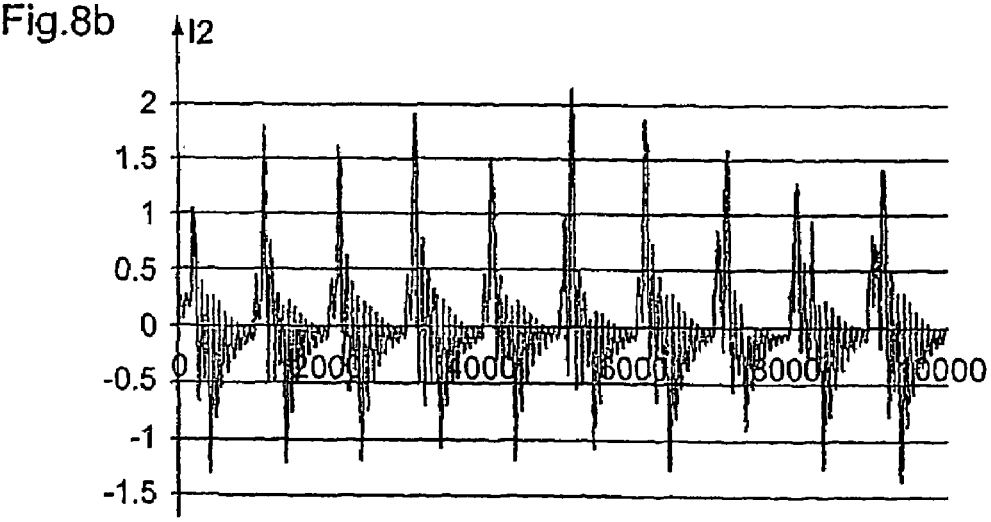
Figure 8C:
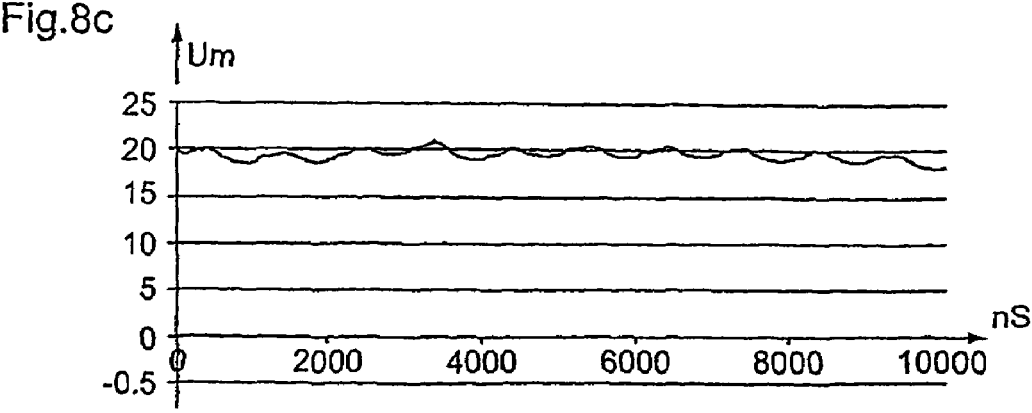

The adjustable voltage source Sm associated with the self-inductance element Lm also allows, depending on the application and in particular when electrolysis phenomena are not considered a problem, the probability of discharge initiation, either in positive or negative mode, to be greatly increased, as can be seen from FIGS. 8a, 8b and 8c. In this particular example, it has been chosen to positively polarize the gap G by adjusting the source Sm to a DC voltage Um of +20 Volts (FIG. 8c). On the diagram of the current i2 (FIG. 8b) that crosses the gap, the preponderance of the positive discharges with current peaks exceeding +1 A can be seen, which correspond to the discharge initiations visible in FIG. 8a.

When the DC voltage source Sm is turned off or when the latter is adjusted to zero, the mean voltage Um across the terminals of the gap P is equal to zero.

According to a simplified variant embodiment illustrated in FIGS. 5 and 6, the DC voltage source Sm can now be eliminated. The mean voltage Um across the terminals of the gap G will now remain constant and zero owing to the presence of the inductance coil Lm, but this voltage will no longer be able to be adjusted to obtain surface treatment operations, coloration processes or to improve the surface condition, as is possible thanks to the source Sm.

It will of course be understood that the embodiments described herein above are in no way limiting and that they may be subject to any desired modifications within the scope such as is defined by claim 1. In particular, the energy reduction device RE could comprise solely the capacitive element C1 disposed on the electrical connection leading from the first pole P1 of the first generator G1 to the tool electrode F forming a first pole of the machining gap G.

The energy reduction device RE could alternatively comprise solely the capacitive element C5 disposed on the electrical connection leading from the second pole P2 of the first generator G1 to the workpiece electrode P forming the second pole of the machining gap G.

The energy reduction device RE could also be equipped with two capacitive elements C1 and C5 on the lines 10 and 11.

These capacitive elements C1 and C5 could be of any kind; capacitors, capacitive electrodes integrated into the contacts W1 and/or W2, wire guides forming capacitive elements, for example in the form of a metallic conductor coated with an insulating material, for example ceramic, or wire guides of special shape, filter-funnel shaped, as shown in FIG. 6.

The energy reduction device RE could, optionally, be completed by a self-inductance element, such as the inductance coil Lm, galvanically connected to the two poles of the gap, namely to the tool electrode and to the workpiece electrode, in order to avoid fluctuations and drifts of the mean voltage Um across the terminals of the gap.

In addition, an adjustable DC voltage source Sm could, optionally, be connected in series with the inductance coil Lm between the poles of the gap.

The first voltage/current source U1 could be of any kind, but will need to allow slopes for the current rise dI/dt of high values that would advantageously be in the range 0.1 to 5 V/nS.

The insulating element disposed between the workpiece electrode P and its holder, such as the insulating plate J, could be eliminated in certain applications.

The tool electrode F could be formed by a different type of tool from a wire, for example a hollow or solid rod, rotating or fixed, or a metal hobbing master.

The two voltage/current sources U1 and U2 for initiating and for sustaining eroding discharges could be integrated into a single voltage and/or current generator that allows two different modes of operation.

The invention claimed is:

1. An electrical discharge machining device comprising a tool electrode (F) and a workpiece electrode (P) forming the poles of a machining gap (G), at least one voltage/current source (U1) connected by an electrical circuit (E) to the tool electrode (F) and to the workpiece electrode (P) and configured for generating electrical pulses and for establishing the initiation of electrical discharges between the tool electrode (F) and the workpiece electrode (P), at least one capacitive element (C1) close to or within contacts (W1, W2) located between said electrical circuit (E) and the tool electrode (F), the capacitive element (C1) is connected in series between the source (U1) and one of the poles of the machining gap (G) wherein it prevents DC components of electrical pulses coming from the source (U1) from being applied across the machining gap (G) and to allow variable current components coming from the source (U1) to flow, wherein the total capacitance (Ceq) of said electrical circuit (E) is reduced with respect to the machining gap (G), wherein the tool electrode is a wire (F) and the capacitive element (C1) is formed by a wire guide (WG) one part of which, in contact with the wire (F), is made of insulating material and another part of which is made of conducting material.

2. The machining device as claimed in claim 1, further comprising a second capacitive element (C5) connected in series between a second pole (P2) of the first source (U1) and arranged close to the workpiece electrode (P).

3. The machining device as claimed in claim 2, further comprising at least one switch (SW3, SW4) installed across the terminals of the capacitive elements (C1, C5) and designed to short-circuit or to render active the capacitive elements across whose terminals it is installed.

4. The machining device as claimed in claim 1, wherein the workpiece electrode (P) is mounted on a holder (T) via an insulator (J).

5. The machining device as claimed in claim 1, wherein the source (U1) comprises a short-circuiting device for producing electrical pulses with steep voltage rising edge slopes.

6. The machining device as claimed in claim 1, wherein the source (U1) is configured so as to produce electrical impulses with a frequency in the range 0.1 to 10 MHz, with a voltage amplitude in the range 60 to 300 V and with a positive or negative voltage rising edge slope in the range 0.1 to 5 V/nS.

7. The machining device as claimed in claim 1, wherein a self-inductance element (Lm) is galvanically connected to the poles of the machining gap (G)

8. The machining device as claimed in claim 7, wherein an inductance value of said self-inductance element (Lm) is such that the resonance frequency (Fo) of the electrical circuit is low relative to the frequency of the electrical pulses of the first source (U1).

9. The machining device as claimed in claim 8, wherein the value of said inductance (Lm) is such that the ratio of the frequency of the electrical pulses to the resonance frequency (Fo) is in the range 50 and 150.

10. The machining device as claimed in claim 8, wherein the value of said inductance (Lm) is such that the ratio of the frequency of the electrical pulses to the resonance frequency (Fo) is in the range 10 to 500.

11. The machining device as claimed in claim 10, wherein an adjustable DC voltage source (Sm) is connected in series with the self-inductance element (Lm) between the two poles of the machining gap (G).

12. The machining device as claimed in claim 11, wherein a switch (SW5) is connected in series with the self-inductance element (Lm) between the poles of the machining gap (G).

* * * * *

UNITED STATES PATENT AND TRADEMARK OFFICE
CERTIFICATE OF CORRECTION

PATENT NO. : 7,608,795 B2
APPLICATION NO. : 10/551688
DATED : October 27, 2009
INVENTOR(S) : Jaques et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 755 days.

Signed and Sealed this

Twelfth Day of October, 2010

David J. Kappos
*Director of the United States Patent and Trademark Office*